United States Patent
Heikamp

(10) Patent No.: US 7,985,273 B2
(45) Date of Patent: Jul. 26, 2011

(54) DEVICE FOR THE PRECIPITATION OF LIQUID DROPLETS FROM A GAS STREAM

(75) Inventor: Wolfgang Heikamp, Waldsee (DE)

(73) Assignee: Mann + Hummel GmbH, Ludwigsburg (DE)

( * ) Notice: Subject to any disclaimer, the term of this patent is extended or adjusted under 35 U.S.C. 154(b) by 0 days.

(21) Appl. No.: 12/739,824

(22) PCT Filed: Oct. 20, 2008

(86) PCT No.: PCT/EP2008/064102
§ 371 (c)(1),
(2), (4) Date: May 25, 2010

(87) PCT Pub. No.: WO2009/053326
PCT Pub. Date: Apr. 30, 2009

(65) Prior Publication Data
US 2010/0242422 A1    Sep. 30, 2010

(30) Foreign Application Priority Data
Oct. 26, 2007 (DE) .................... 20 2007 015 034 U

(51) Int. Cl.
*B01D 9/00* (2006.01)
(52) U.S. Cl. .......... 55/459.1; 55/337; 55/385.1; 55/434; 55/447; 55/323; 55/325; 96/268
(58) Field of Classification Search ................ 55/337, 55/447, 434, 459.1, 385.1, 323, 325; 95/268
See application file for complete search history.

(56) References Cited

U.S. PATENT DOCUMENTS

| | | | |
|---|---|---|---|
| 2,970,671 A * | 2/1961 | Warner ........................... | 55/327 |
| 3,447,290 A * | 6/1969 | Flory ............................. | 55/322 |
| 4,872,890 A | 10/1989 | Lamprecht | |
| 6,475,256 B2 * | 11/2002 | Matsubara et al. ............ | 55/337 |
| 6,558,444 B1 | 5/2003 | Hunter | |
| 6,679,930 B1 * | 1/2004 | An et al. ........................ | 55/337 |
| 7,744,668 B2 * | 6/2010 | Oh et al. ........................ | 55/343 |
| 7,780,753 B2 * | 8/2010 | Lang ............................. | 55/337 |
| 2004/0089153 A1 | 5/2004 | Burns | |
| 2006/0277872 A1 * | 12/2006 | Yoo ............................... | 55/337 |
| 2010/0011724 A1 * | 1/2010 | Xu ................................ | 55/459.1 |

FOREIGN PATENT DOCUMENTS

DE    3442626    5/1986

OTHER PUBLICATIONS

German patent office search of priority application DE 20 2007 015 034.2; PCT search report of PCT/EP2008/064102.

* cited by examiner

*Primary Examiner* — Jason M Greene
*Assistant Examiner* — Dung Bui
(74) *Attorney, Agent, or Firm* — James Hasselbeck

(57) ABSTRACT

A device for the precipitation of liquid from a gas stream includes a preseparator chamber in a first housing portion arranged to flow a gas stream laterally centrally to rebound from an opposing sidewall and deflect upwards to a main separator in a second housing portion. The main separator includes a drainage element separating oil from the gas stream. A guide element is arranged between the housing portions and includes an outer wall with a central opening and at least one guide part arranged on the wall to laterally deflect the gas stream. The deflected gas stream flows laterally through the main separator.

6 Claims, 1 Drawing Sheet

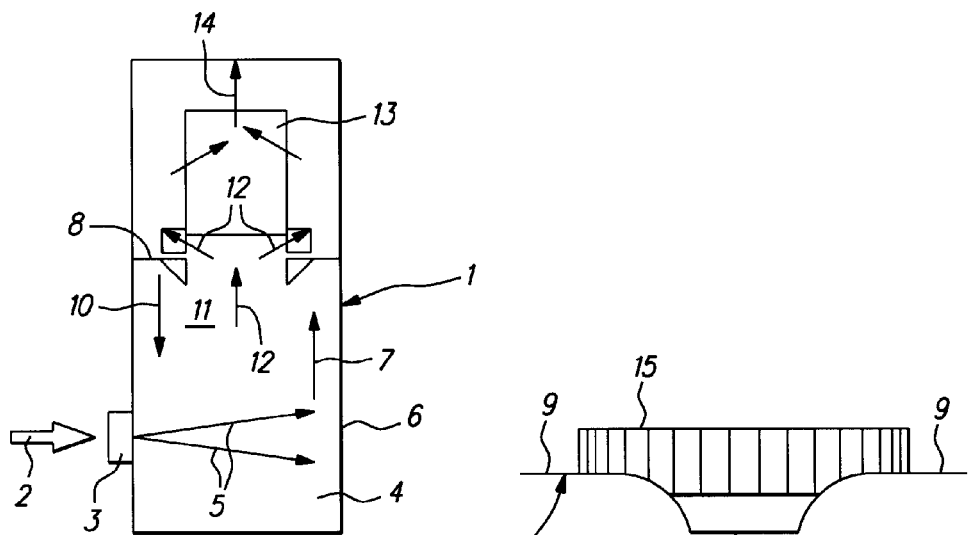
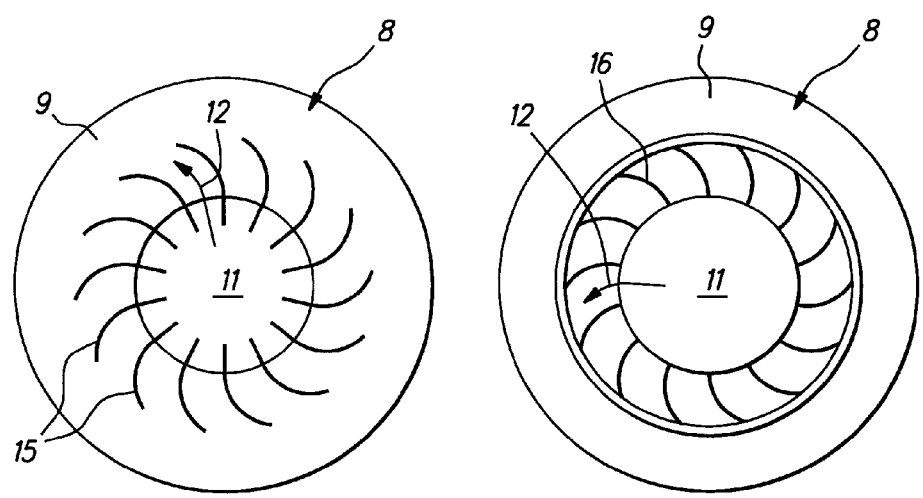

DEVICE FOR THE PRECIPITATION OF LIQUID DROPLETS FROM A GAS STREAM

CROSS REFERENCE TO RELATED APPLICATIONS

This application is US National Stage Entry of international patent application no. PCT/EP2008/064102, filed Oct. 20, 2008 designating the United States of America, the entire disclosure of which is incorporated herein by reference. Priority is claimed based on Federal Republic of Germany patent application no. 20 2007 015034.2, filed Oct. 26, 2007.

TECHNICAL FIELD

The invention concerns a device for the precipitation of liquid droplets, in particular oil, from a gas stream, in accordance with the preamble of the independent claim.

PRIOR ART

In a plurality of applications in engineering gases occur that are enriched with liquid droplets, in particular oil droplets, and therefore form so-called aerosols that may cause damaging to devices arranged downstream. Such liquid droplets can be entrained mechanically, for example, by passing the gas through the liquid, or by guiding the gas stream across a liquid or they are contained as a result of construction-based conditions.

In the case of screw-type compressors it is conventional that oil comes into contact with air. The oil is used for sealing, cooling and lubrication of the compressor and is entrained in a magnitude of 1 to 5 kg per $m^3$. For the still required oil removal in such screw-type compressors often so-called droplet separator are used for precipitating the oil droplets from the compressed air.

Such droplet separators can be configured in a generally known way as inertia separators wherein the mass inertia of the droplets is utilized in order to precipitate the droplets on walls. Inertia separators are especially suitable for larger droplets, usually above approximately 20 $\mu$m of droplet diameter. A simple form of a droplet precipitator is an impact plate where a gas stream loaded with liquid droplets is guided against a plate such that the gas stream will change its direction. Because of the mass inertia the droplets that are contained in the gas stream maintain their direction, impact on the plate and are drained off from there.

A special type of inertial separation is realized by centrifugal forces in so-called cyclones wherein the gas stream is guided by guide elements onto a curved path. Because of the centrifugal forces the droplets are guided onto an outer path with a radius of curvature as large as possible. The droplets can be precipitated on a wall along the outer area of the gas stream and the droplets are drained off from the wall and optionally returned into the system.

Such a guide element for an oil separator for a screw-type compressor is, for example, disclosed in DE 36 42 002 C in which an axial incoming flow of a gas stream to be purified is deflected into a radially outwardly directed flow and the liquid droplets are then diverted into an outer annular flow passage.

Often, such devices for the separation of liquid droplets are configured also in a multistage embodiment wherein the aforementioned cyclones are used as pre- and/or post-separators and, as main separators, so-called drainage elements are used. In such drainage elements a gas stream loaded with liquid droplets is driven through a mesh-like and/or porous drainage structure, for example, a wire fabric or a nonwoven fabric, for example, of plastic material or glass fiber. The liquid droplets pass through drainage structure slower than the gas stream and are moved by gravity to the geodetically lower area of the drainage structure, collect thereat and can then be drained off. In this connection, as a result of certain drainage structures smaller droplets will combine to larger droplets, i.e., they coalesce, and can therefore be removed even better from the gas stream.

Depending on the application, different combinations of separating stages as well as cyclones or drainage and coalescing elements are considered for separating liquid droplets from gases. For example, when for constructive reasons the preseparator is designed such that a direct flow of the gas to be purified with an approximately perpendicular impact of the gas stream onto a wall is selected, even a gas stream that is deflected vertically upwardly in the wall area still entrains so many liquid droplets that this leads to a disadvantageous overload of the downstream drainage element.

SUMMARY OF THE INVENTION

The invention concerns a device for separating liquid droplets from a gas stream, comprising a preseparating chamber in which the gas stream to be purified is guided such that it rebounds form a wall of the preseparating chamber and as a result of the flow pressure within the wall area is deflected vertically in the upward direction. Moreover, a main separator is arranged vertically above the preseparator and has a drainage element that is passable laterally from the exterior to the interior by the gas stream to be purified and that centrally releases the purified gas stream vertically in the upward direction. In an advantageous way, a guide element between the preseparating chamber and the main separator is present that is provided in the outer wall area with a closed area that blocks the gas stream and centrally with an open area that allows passage of the gas stream, wherein the gas stream is deflectable by guide parts arranged in the central area laterally outwardly to flow against the main separator.

The gas stream to be purified can be, for example, the compressed air of a screw-type compressor that is enriched with oil. With the invention, it can then be achieved in an advantageous way that the oil that is sprayed with the incoming air stream against the wall and then flows upwardly through the guide element no longer causes a high oil loading of the main separator or the drainage element because the oil flow is blocked by the shape of the guide apparatus within the wall area. Therefore, the complete degree of preseparation can be utilized because a pressure loss by a possibly clogged main separator is substantially prevented and, therefore, the service life of the device can be extended. The oil can be guided in the device according to the invention to the geodetic bottom end in the preseparating chamber and drained.

The device according to the invention with the preseparating chamber, the guide element and the drainage element is embodied advantageously cylindrically and the gas stream to be purified is laterally guided through an appropriately arranged opening centrally into the preseparating chamber so that substantially an impact of the gas stream with the liquid droplets on the oppositely positioned wall of the preseparating chamber is realized.

The guide parts on the guide element are displaced tangentially from the interior to the exterior in an especially advantageous way so that a tangential flow of the gas stream about the drainage element results.

BRIEF DESCRIPTION OF THE DRAWINGS

The invention will be explained with the aid of a drawing with embodiments. It is shown in:

FIG. 1 a schematic illustration of a device as an oil separator for the compressed air of a screw-type compressor with a guide element in accordance with the invention;

FIG. 2 an embodiment of the guide element in a detail illustration as a section view; and FIGS. 3 and 4 two plan views onto such guide elements in different embodiments.

EMBODIMENT(S) OF THE INVENTION

In FIG. 1 a schematic illustration of a device 1 for separating oil from the compressed air of a screw-type compressor is shown as it has been described in the introductory portion of the description.

The gas stream 2 (compressed air) that is loaded with liquid droplets (oil) reaches through opening 3 a preseparating chamber 4 of the device 1. The arrows 5 indicate how the gas stream impacts on the oppositely positioned wall 6 of the preseparating chamber 4 and then the gas stream is deflected in the upward direction according to arrow 7 in the flow direction of the device 1. The gas stream still has so much kinetic energy at this point that it entrains a large proportion of liquid droplets; upon direct impact on a main separator 13 with a drainage element that is arranged geodetically above this would lead easily to fast clogging.

With a guide element 8 in accordance with the invention, shown in FIG. 2 in section in more detail, by means of a closed area 9 relative to the wall of the device 1, it is achieved that the gas flow according to arrow 7 does not reach the top but is returned into the preseparator according to arrow 10. In this way, a large portion of the liquid droplets is maintained within the preseparator and a fast clogging of the main separator 13 is prevented.

Through the central open area 11 in the guide element 8 the gas stream to be purified now reaches in accordance with arrows 12 laterally the main separator 13 and flows downstream of the main separator 13 out of the device according to arrow 14.

In FIGS. 3 and 4 embodiments of guide parts 15 and 16 are shown that are secured at the closed area 9 and deflect tangentially the gas stream that enters through the open area 11 according to arrows 12 and guide it in this way onto the exterior of the main separator 13 according to FIG. 1.

The invention claimed is:

1. A device for separating liquid droplets from a gas stream, comprising: a device housing; a preseparator chamber arranged within a lower first portion of said housing, said housing having an inlet opening arranged to deliver a gas stream to be purified into said preseparator chamber to flow laterally centrally through said chamber to rebound from an opposing sidewall of said preseparator chamber, wherein a flow pressure developed within an area of said opposing sidewall deflects said gas stream vertically upwards in said housing; a main separator arranged within a second portion of said housing positioned above said preseparator chamber, said main separator including a drainage element, said drainage element passable by said gas stream laterally from an exterior to an interior of said drainage element, said drainage element operable to separate oil from said gas stream; a guide element arranged between and separating said first and second housing portions, said guide element including: an outer wall having a central opening, said outer wall extending laterally between and closing to sidewalls of said housing, said outer wall permitting flow between said first and second housing portions only through said central opening; at least one guide part arranged on a said outer wall and positioned to laterally deflect said gas stream flowing from said first portion through said central opening laterally outwards toward said sidewalls of said second portion of said housing; wherein said deflected gas stream from said at least one guide part is received at said exterior of said main separator to flow laterally through said main separator.

2. The device according to claim 1, wherein the device together with the preseparating chamber, the guide element and the drainage element have a cylindrical configuration.

3. The device according to claim 1, wherein the gas stream to be purified is guided through said inlet opening laterally centrally into said preseparating chamber to impact said gas stream onto said opposing sidewall of said preseparating chamber.

4. The device according to claim 1, wherein said guide parts of said guide element are shaped to tangentially displace said gas stream flowing from said guide parts to flow tangentially in said second housing portion, said tangential flow occurring about said exterior of said main separator.

5. The device according to claim 1, wherein the gas stream to be purified is an oil-enriched compressed air of a screw-type compressor.

6. The device according to claim 1, wherein oil separated from said gas stream is guided and drained geodetically downwardly into said preseparating chamber.

* * * * *